H. A. MAVOR.
ELECTRIC SPEED CONTROLLING MEANS.
APPLICATION FILED SEPT. 20, 1909.
1,092,797.
Patented Apr. 7, 1914.
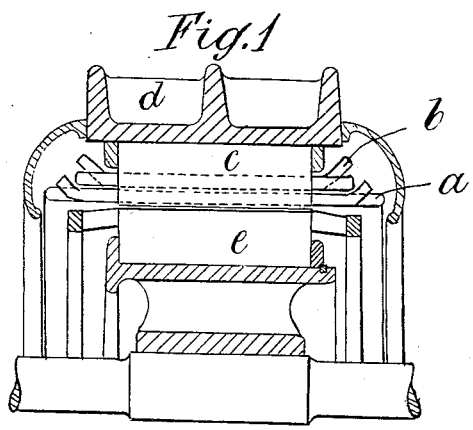
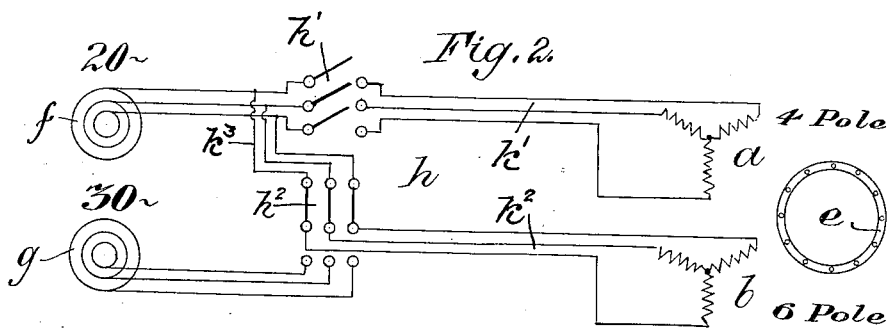
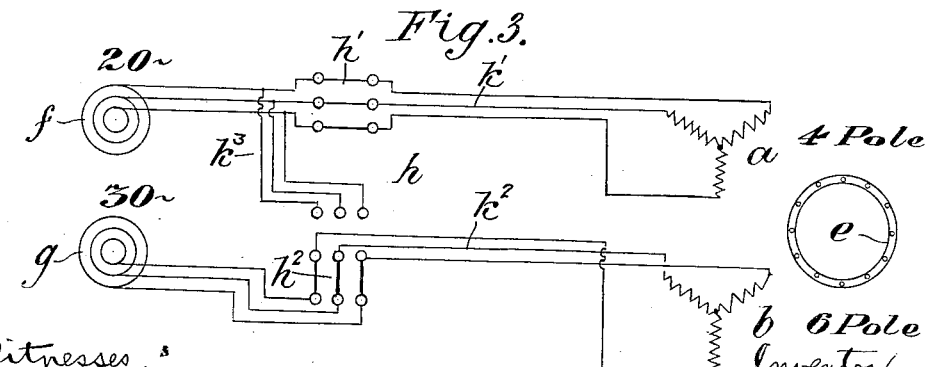

UNITED STATES PATENT OFFICE.

HENRY ALEXANDER MAVOR, OF GLASGOW, SCOTLAND.

ELECTRIC SPEED-CONTROLLING MEANS.

1,092,797.   Specification of Letters Patent.   Patented Apr. 7, 1914.

Application filed September 20, 1909. Serial No. 518,560.

*To all whom it may concern:*

Be it known that I, HENRY ALEXANDER MAVOR, a subject of the King of Great Britain and Ireland, residing at Glasgow, Scotland, have invented certain new and useful Improvements in Electric Speed-Controlling Means, of which the following is a specification.

This invention relates to the speed control of bodies effected by the aid of a plurality of alternators of different periodicities.

More particularly the invention relates to the speed control of a body having an induction motor drive.

In systems heretofore proposed a plurality of alternators have been combined with a plurality of motors, corresponding or not, as desired, with the number of alternators employed, each motor having a different number of poles than the others, and so designed that when severally connected with the appropriate alternator of the corresponding number of alternators, or with some of a non-corresponding number of alternators, the same speed of rotation is produced.

The object of the present invention is to simplify arrangements of the kind referred to so that a single rotor and a single stator having equivalent characteristics to the multiple motors may be employed. For this purpose, the required stator windings are, according to the present invention, combined in one framework or structure in which slots are arranged to take the windings that give respectively the required numbers of poles. This stator with its multiple windings is caused to actuate a squirrel cage rotor disposed in the usual manner with respect to the stator.

While it is broadly known to provide an induction motor with separate windings suitable for various pole numbers so that different speeds can be obtained with a single alternator, depending upon the windings connected in circuit, and also to operate an induction motor having a single winding at different speeds from a plurality of alternators of different periodicities, it has not heretofore been proposed to use simultaneously two, three or more windings on a single induction motor in conjunction with a plurality of alternators of different periodicities.

A feature of the present invention consists therefore in using the motor windings and alternators so as to secure a combination and addition of the powers thereof without parallel connections or any connection between the different motor windings, as well as singly when less power is required.

The accompanying drawings illustrate one arrangement of motor with multiple windings and single rotor according to the invention, Figure 1 being a central longitudinal section of the upper half of the motor and Figs. 2 and 3 diagrams of the circuit connections.

In Fig. 1, $a$ is a four pole winding and $b$ a six pole winding occupying slots in the laminated ring $c$ which is mounted on the stator frame $d$. It will be evident from Fig. 1 of the drawings that the windings $a$ and $b$ are axially concentric and are arranged to excite individually or collectively substantially the same magnetic material thereby producing a single resultant magnetic field. $e$ is an ordinary squirrel cage rotor, inductively related to each of the primary windings $a$ and $b$.

In Figs. 2 and 3, $f$ represents a 20 period alternator and $g$ a 30 period alternator. In Fig. 2, current is supplied from the 20 period alternator $f$ through suitable switch mechanism $h$ to the six pole winding $b$, the winding $a$ and alternator $g$ being out of use. In this way the motor will run at about half power with a low speed of the rotor $e$.

In Fig. 3, the 20 period alternator $f$ is connected to the four pole winding $a$ and the 30 period alternator $g$ to the six pole winding $b$ thereby obtaining high speed and full power of the motor.

As will be seen from Figs. 2 and 3, the switch mechanism $h$ comprises a one-way switch $h^1$ and leads $k^1$ adapted to connect the alternator $f$ of lower periodicity with the motor winding $a$ of lower pole number and a two-way switch $h^2$ and leads $k^2$ adapted to connect the alternator $g$ of higher periodicity with the motor winding $b$ of higher pole number, thereby, as shown in Fig. 3, securing a definite speed and full power, and leads $k^3$ associated with the two-way switch $h^2$ and the alternator $f$ of lower periodicity adapted when the one-way switch $h^1$ is open, as shown in Fig. 2, to permit the two-way switch $h^2$ to be operated to connect the alternator $f$ of lower periodicity to the motor winding $b$ of higher pole number and to leave the other alternator *g* idle, thereby securing a lower speed and less power.

It will thus be seen from the preceding description that the present invention provides an arrangement for controlling the speed of an alternating current motor having a plurality of independent windings of different pole numbers housed in the same stator by supplying to said windings energy of different periodicities. Energy may be supplied to only one of the windings of the motor, as indicated in Fig. 2, or may be supplied simultaneously to all of the windings, as indicated in Fig. 3. When the alternators are simultaneously connected to their respective corresponding windings, as indicated in Fig. 3, each winding will produce the same synchronous speed, and accordingly the torques developed in the rotor by the windings will be cumulative and equal to the sum of the torques due to the respective windings. By such an arrangement, when it is desired to increase the speed of rotation of the motor, increased speed being usually associated with increased power, the addition of a second generator to the power system can be accomplished without the necessity of parallel running and synchronism of the generators. At the same time the practical operation of the generators at a predetermined speed and periodicity and utilization of the whole of the effective work of all the motor windings is accomplished without sacrifice of the motor characteristics with respect to power-factor and efficiency.

What I claim is:—

1. Speed controlling means comprising in combination a plurality of electric alternators of different periodicities, an alternating current motor having a plurality of primary windings of different pole numbers arranged in a single stator, the periodicities of said alternators and the pole numbers of said primary windings being so related that a substantially common speed of rotation of the rotor of the motor may be produced by electrically connecting any particular alternator to a particular corresponding primary winding, a secondary winding for the motor inductively related to all of the primary windings, and means for electrically connecting the particular alternators to the corresponding primary windings for simultaneous operation.

2. Speed controlling means comprising in combination, a plurality of electric alternators of different periodicities, an alternating current motor having a plurality of primary windings of different pole numbers arranged in a single stator, the pole numbers of the primary windings being such that each winding tends to give the rotor of the motor substantially the same speed of rotation when such winding is electrically connected to a particular corresponding alternator, a secondary winding for the motor inductively related to all of the primary windings, and means for electrically connecting a plurality of the primary windings to said particular corresponding alternators for simultaneous operation.

3. Speed controlling means comprising in combination, a plurality of electric alternators of different periodicities, an alternating current motor having a plurality of primary windings of different pole numbers, said primary windings being arranged to excite individually or collectively substantially the same magnetic material thereby producing a single resultant magnetic field and the number of primary windings corresponding to the number of alternators and the pole numbers of the primary windings being such that each winding tends to give the rotor of the motor substantially the same speed of rotation when such winding is connected to a particular corresponding alternator, a secondary winding for the motor inductively related to all of the primary windings, and means for electrically connecting a plurality of said primary windings to their particular corresponding alternators for simultaneous operation.

4. Speed controlling means comprising in combination an alternating current motor having a plurality of primary windings of different pole numbers arranged in a single stator, the pole numbers of said windings being such that a substantially common predetermined speed of rotation of the rotor of the motor may be produced by supplying to any primary winding electric energy of a particular corresponding frequency, a secondary winding for the motor inductively related to all of the primary windings, and means for simultaneously supplying to a plurality of said primary windings electric energy of the appropriate corresponding frequency for producing the common speed of rotation of the rotor whereby the torque developed by the rotor is cumulative and substantially equal to the sum of the torques due to the respective windings.

Signed at London, England this 9th day of September 1909.

HENRY ALEXANDER MAVOR.

Witnesses:
WILLIAM PRINGLE,
ARTHUR A. FISHER.

Copies of this patent may be obtained for five cents each, by addressing the "Commissioner of Patents, Washington, D. C."